(12) United States Patent
Walther et al.

(10) Patent No.: US 7,645,836 B2
(45) Date of Patent: Jan. 12, 2010

(54) PROCESS FOR PRODUCING HIGH QUALITY IONOMERS

(75) Inventors: Brian W. Walther, Clute, TX (US); Anthony C. Neubauer, Piscataway, NJ (US); Eung Kyu Kim, Midland, MI (US); Calvin Lee Pavlicek, Midland, MI (US); Charles F. Diehl, Lake Jackson, TX (US)

(73) Assignee: Dow Global Technologies, Inc., Midland, MI (US)

( * ) Notice: Subject to any disclaimer, the term of this patent is extended or adjusted under 35 U.S.C. 154(b) by 62 days.

(21) Appl. No.: 11/934,112

(22) Filed: Nov. 2, 2007

(65) Prior Publication Data

US 2008/0108756 A1    May 8, 2008

Related U.S. Application Data

(60) Provisional application No. 60/856,132, filed on Nov. 2, 2006.

(51) Int. Cl.
*C08F 8/42* (2006.01)

(52) U.S. Cl. ............... 525/330.2; 525/366; 525/367; 525/369

(58) Field of Classification Search .......... 525/330.2, 525/367, 369, 366
See application file for complete search history.

(56) References Cited

U.S. PATENT DOCUMENTS

| | | | |
|---|---|---|---|
| 3,264,272 A | 8/1966 | Rees | |
| 3,649,578 A * | 3/1972 | Bush et al. | ............... 524/322 |
| 4,847,164 A | 7/1989 | Neill et al. | |
| 5,222,739 A | 6/1993 | Horiuchi et al. | |
| 5,232,985 A | 8/1993 | Hallden-Abberton | |
| 5,554,698 A | 9/1996 | Wang et al. | |
| 5,569,712 A | 10/1996 | Wang et al. | |
| 5,569,722 A | 10/1996 | Wang et al. | |
| 5,576,396 A * | 11/1996 | Wang et al. | ............... 525/367 |
| 5,597,869 A | 1/1997 | Wang et al. | |
| 5,599,877 A | 2/1997 | Wang et al. | |
| 5,631,328 A | 5/1997 | Wang et al. | |
| 5,756,659 A | 5/1998 | Hughes et al. | |
| 5,837,779 A * | 11/1998 | Current et al. | ............... 525/369 |
| 6,100,321 A | 8/2000 | Chen | |

FOREIGN PATENT DOCUMENTS

WO    WO-96/07677    3/1996

OTHER PUBLICATIONS

International Search Report PCT/US2007/083407.

* cited by examiner

*Primary Examiner*—Ling-Siu Choi (57) ABSTRACT

A reactive extrusion process for producing an ionomer is disclosed. The process comprising adding a polymer containing a carboxyl functionality to an extruder, then homogenously melting the polymer in a melting zone of the extruder. A first melt seal zone of the extruder is formed to separate the melting zone from an injection zone where an aqueous solution of metallic ions are added to the molten polymer. The first melt seal zone is formed by increasing the pressure in the melt seal zone to a pressure which is higher than the vapor pressure of the water at any point in the injection zone and the reaction zone. The aqueous solution of metallic ions is then mixed with the polymer containing the carboxyl functionality in a reaction zone of the extruder under conditions such that the metallic ions are substantially reacted with the carboxyl functionality. A pressure build-up zone is formed in the extruder, wherein the pressure build-up zone is located no earlier than at the end of the reaction zone wherein the pressure build-up zone is formed by increasing the pressure to a level such that the aqueous solution of metallic ions remains in the liquid phase for a time sufficient to allow for the desired reaction between the metallic ions and the carboxyl functionality of the polymer.

12 Claims, 4 Drawing Sheets

PROCESS FOR PRODUCING HIGH QUALITY IONOMERS

CROSS REFERENCE STATEMENT

This application claims the benefit of U.S. Provisional Application No. 60/856,132 filed on Nov. 2, 2006.

FIELD OF INVENTION

The present invention relates to a new process for producing polymeric ionomer compositions having improved properties. The process involves a reactive extrusion process characterized as having at least four zones. A first zone allows for the addition and melting of a polymer containing a carboxyl functionality. A second zone allows for the addition of an aqueous solution of metallic ions. A third zone allows for a mixing and reacting the aqueous solution of metallic ions with the polymer containing the carboxyl functionality. A fourth zone allows for the discharge of the ionomer and water vapor. The process is characterized by keeping the pressure in the reactive extruder sufficiently high to deter water vapor from leaving the third zone until there has been sufficient residence time to allow for a substantially complete reaction given the mixing capability in the third zone. The ionomer compositions of the present invention are characterized by improved clarity and reduced level of gels without detrimentally effecting other properties. As such, the ionomers are ideally suited for applications such as golf balls, bowling pin covers, car bumper guards, side molding strips, shoe parts, packaging films, coatings, and adhesives.

BACKGROUND AND SUMMARY OF THE INVENTION

Ionomers and methods to produce them, are well known in the art. The present invention relates to those ionomers which are formed by a neutralization or saponification reaction of a copolymer comprising an alpha olefin and a vinyl monomer having a carboxyl group. Such copolymers include interpolymers as well as grafted copolymers and block copolymers. The neutralization reaction is such that metal salts are formed on at least some of the carboxyl groups. Such ionomers can be used in premium applications such as film tie layers, heat seal layers, golf ball covers, and for impact modification. For many of these applications it is desired that the ionomers exhibit high clarity with minimal gels.

U.S. Pat. No. 3,264,272 describes melt blending a solution containing metallic ions with a copolymer comprising an alpha-olefin and an alpha beta ethylenicaly unsaturated carboxylic acid. It is not believed that the melt blending methods disclosed in this reference would produce ionomers of the consistency and clarity desired.

U.S. Pat. No. 4,847,164 describes a process of incorporating a metal oxide into an ethylene copolymer to form a concentrate or masterbatch and then melt blending a minor amount of the concentrate into an ethylene/carboxylic acid copolymer. This process is reported to achieve a more uniform dispersion of the metal oxide, and avoids reported problems of bubbling when aqueous solutions of metal compounds are used.

U.S. Pat. No. 5,631,328 discloses ionomers having a haze of no more than 10 percent as measured by ASTM method D1003. The reference describes a method which comprises contacting a Group IA metal containing solution with a molten or fluid copolymer comprising alpha-olefins having from two to eight carbon atoms and esters of alpha, beta ethylenically-unsaturated carboxylic acids having from four to twenty two carbon atoms and intensively mixing the copolymer and Group IA metal-containing solution at a temperature and to an extent which provides an ionomers composition having no more than 10 percent haze. While ionomers prepared in such a manner are useful, they are still subject to the occurrence of white specs, which detract from the utility of such materials.

The present invention includes a reactive extrusion process for producing a polymeric ionomer comprising the steps of adding a polymer containing a carboxyl functionality to an extruder; homogenously melting the polymer in a melting zone of the extruder; forming a melt seal zone of the extruder; adding an aqueous solution of metallic ions to the molten polymer in an injection zone of the extruder, wherein the injection zone is located after the melt zone of the extruder; mixing the aqueous solution of metallic ions with the polymer containing the carboxyl functionality in a reaction zone of the extruder under conditions such that the metallic ions are substantially reacted with the carboxyl functionality; and then discharging the reacted ionomers. The process is characterized by ensuring that the pressure in the area of the reactive extruder surrounding the injection zone is sufficiently high to ensure that the aqueous solution remains in solution for a sufficient time to allow for the metallic ions to substantially react with the carboxyl functionality. Ideally the melt seal zone is maintained at a pressure higher than the highest vapor pressure of the aqueous solution during the injection zone and the reaction zone, so as to ensure that no water vapor travels against the direction of the polymer flow. The pressure in the injection and reaction zones should be sufficiently high to prevent the water in the aqueous solution from vaporizing until there has been sufficient residence time to allow for a substantially complete reaction of the metallic ions with the carboxyl groups of the polymer. This can optionally be done with the aid of a second melt seal zone after the reaction zone which is maintained at a pressure higher than the highest vapor pressure of the aqueous solution during the injection zone and the reaction zone, although as long as there is a pressure build-up zone which slows the vaporization up enough to allow for a sufficient residence time (given the mixing conditions in the reaction zone) to allow the desired reaction between the metallic ions in solution and the carboxyl functionality in the polymer to be substantially complete, a total seal is not necessary. It should be understood that this pressure build-up zone can be part of the reaction zone itself or be located after the reaction zone as long as it generates sufficient back pressure to ensure that the aqueous solution does not vaporize in the reaction zone.

In another aspect of the present invention, novel ionomers compositions are provided as distinguished by their clarity and the reduced amounts of gels or other inclusions.

DETAILED DESCRIPTION OF THE INVENTION

The present invention generally relates to ionomers prepared by reacting a carboxyl containing polymer with an aqueous solution of metallic ions.

The carboxyl containing polymer can be any polymer having a $CO_2H$ functionality. Most commonly, the carboxyl group comes from a monomer in the form of a carboxylic acid or derivative, and includes monomers such as acrylic acid, methacrylic acid, ethacrylic acid, itaconic acid, maleic acid, fumaric acid and monoesters of such as methyl hydrogen maleate, methyl hydrogen fumarate, ethyl hydrogen fumarate and maleic anhydride. Most commonly the carboxyl containing monomer is copolymerized with an alpha olefin monomer, preferably an alpha-olefin having from 2 to 8 carbon atoms. The concentration of carboxyl groups in the polymer is typically in the range of from 0.2 mol % to about 25 mol %, more typically from 1.0 mol % to about 12 mol %. Suitable carboxyl-containing polymers include ethylene acrylic acid copolymers such as those sold under the trade name PRIMACOR by the Dow Chemical Company.

While any polymer having the carboxyl functionality could be used with the present invention, for many applications, it is preferred that the material have a Melt Index as determined by ASTM-D1238 (2.16 kg/190° C.) in the range of from about 1 g/10 minute to about 2000 g/10 minute, more preferably from about 10 g/10 minute to about 500 g/10 minutes and even more preferably from about 25 g/10 minute to about 200 g/10 minute.

Suitable metal ions for use in the present invention include one or more of the mono-, di-, and trivalent ions of metals in Groups I, II, and III of the periodic table of Elements. Of these, the alkali metals of Group IA are generally preferred, with lithium and sodium being ideally suited for certain applications. Additionally, suitable metal ions may be found among the transition metals.

Conveniently, the aqueous solution of metal ions can be prepared by adding metal hydroxide to water, although other salts are also possible. For lithium, it is preferred that a 5% by weight to 18% by weight solution of LiOH in water be prepared more preferably 8% by weight to 15% by weight of LiOH, with about 10 weight percent being most preferred for room temperature storage and delivery, with higher percentages being acceptable for high temperature storage and delivery.

For sodium salts such as NaOH, it has been discovered that even though the sodium salt is much more soluble in the aqueous medium, it is preferred that lower concentration solutions be used, particularly when the resulting ionomer is desired to be low in color. Color can conveniently be evaluated in terms of its Yellowness Index (YI) as determined by ASTM 6290. Thus even though the saturation point of NaOH in water at room temperature may be greater than 50% by weight of NaOH, the use of such high concentrations resulted in ionomers having an amber color, regardless of improved mixing conditions. For sodium ionomers, it is preferred that a solution containing only from 5% to 25% by weight NaOH be used, with 10% to 25% being even more preferred. As will be generally recognized by one of ordinary skill in the art, for processing reasons higher concentrations are generally preferred as this will result in less water to be removed. This considereadtion should be balanced against the increase in YI observed with higher concentrations.

It was also generally observed that lower color (that is, a lowere YI) could be achieved with the sodium ionomers by improving mixing efficiency. For example, the use of a 25% NaOH solution with increased screw speed was observed to produce ionomers having equivalent YI to ionomers obtained using a 10% NaOH solution with a slower screw speed.

The preferred concentrations for other salts will vary, but should be selected so as to have sufficient solubility until delivery to the reactive extruder.

For purposes of this invention, it may be convenient to add slurries of metal oxides which have limited solubility in water such that the reactivity of the metal oxide in the slurry is enhanced by the presence of a significant amount of water in the liquid form during the reaction zone. For example, zinc oxide is known to have limited solubility in water, but under high temperature and pressure in the presence of water may be more efficiently reacted with the carboxylic moieties. Thus it should be understood that the term "aqueous solution" as used in this invention includes aqueous slurries.

The ionomers of the present invention are conveniently made using a reactive extrusion process. Extruders and extrusion processes are well known in the art. Any continuous-type extrusion systems may be used. The extruder should be selected to ensure that it has sufficient conveying, melting and mixing capabilities. The extruder should also have a feeding zone to allow the addition of solid polymer, a liquid injection feeder, and ideally devolitization capabilities. Suitable continuous-type extrusion systems include higher outside diameter/inside diameter ratio intermeshing co-rotating twin screw extruders tangential-counter rotating twin-screw extruders, multi-stage single-screw extruders or a combination of two or more of these continuous type mixers.

Figure 1:
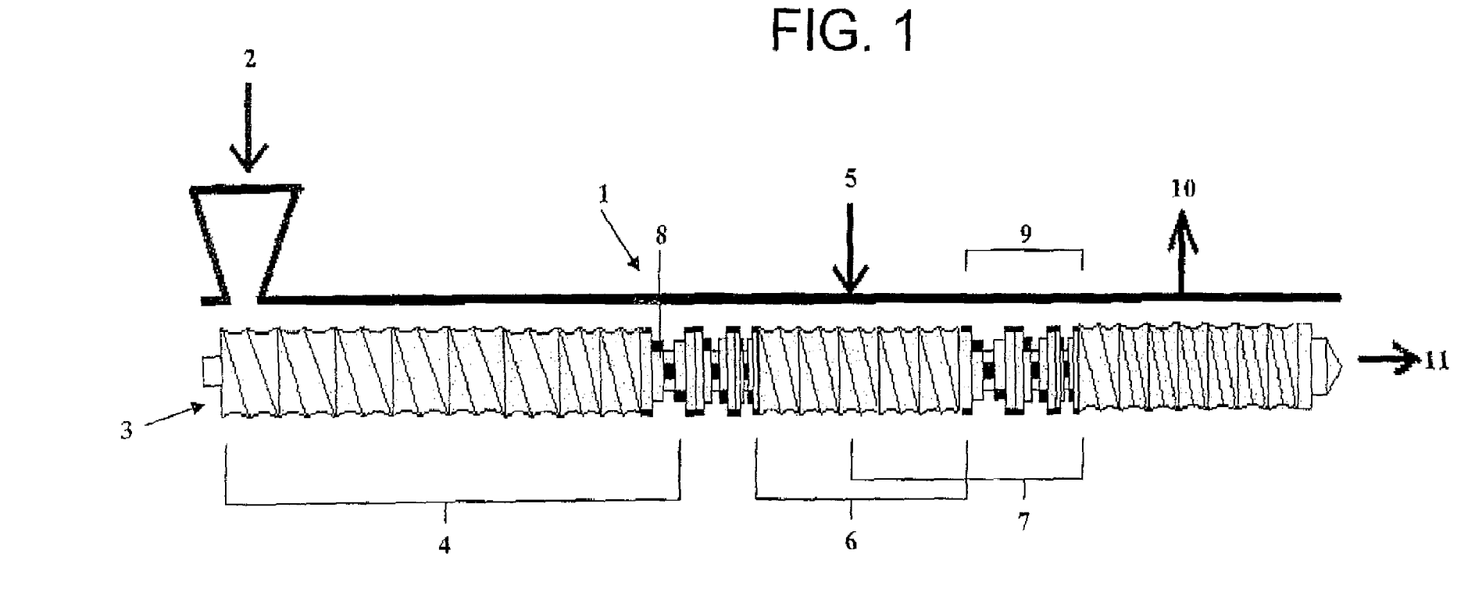
FIG. 1 is a schematic of a twin screw extrusion system suitable for use in the present invention.

One suitable continuous mixing device is depicted in FIG. 1. That figure shows a cross section of a simple reactive extruder (1). The solid polymer is added to the extruder (1) in the feed section (2) and is melted and conveyed via a screw (3). The polymer is melted in a melting zone (4) of the extruder (1) and conveyed through a first melt seal zone (8). An injection port (5) allows an aqueous solution of metal ions to be introduced in an injection zone (6) of the extruder (1). The molten polymer and aqueous solution of metal ions are then thoroughly mixed in a reaction zone (7) of the extruder (1) and conveyed through a pressure-build-up zone (9), which is located such that the polymer material only passes the zone after the metallic ions have substantially reacted with the carboxyl functionality. Thus, it should be understood that the reaction zone (7) and the pressure build up zone (9) may overlap, so long as the reaction zone (7) does not extend past the pressure build-up zone (9). A devolatilization port (10) then allows residual water to be removed from the polymer prior to passing through a strand die cutter or other suitable discharge means (11).

It should be understood that different length to diameter ratios (L/D) can be used in this invention so long as proper residence time is maintained to ensure proper melting, mixing, and reaction. For example the L/D can be greater than 40, but is more preferably in the range of 30 to 40, more preferably in the range of 30 to 35.

The residence time and temperature in the reaction zone should be such that a minimum of 99% and preferably essentially 100%. Metal ions which do not participate in a neutralization reaction with the polymer tend to precipitate once the water is removed and appear as particulates in the polymer. The present invention eliminates the presence of these particulates by driving the reaction to complete conversion. While not intending to be bound by theory, it is believed that by providing the pressure build-up and melt seal zones to ensure that the metal ions remain in solution, the reaction is limited only by diffusion.

As is known in the art the molar equivalents of metal salt given the particular carboxylic molar content in the polymer can be adjusted depending on the end use needs of the polymer, with higher levels of neutralization being generally preferred for applications requiring high abuse resistance and lower levels of neutralization (that is, higher levels of unreacted carboxylic groups) being generally preferred for applications requiring lower viscosities.

Of key importance to this aspect of the present invention, the temperatures and pressures of the extruder are maintained such that the pressure of the melt seal zone (8) is higher than the vapor pressure of the water at any point within the injection (6) and reaction (7) zones. In this manner, it can be assured that water vapor does not escape out the feed section of the extruder prior to the metal ions substantially reacting with the carboxyl groups of the polymer. Similarly the pressure build-up zone (9) must be kept at a pressure high enough to ensure a sufficient residence time to allow the desired reaction between the metal ions in the aqueous solution and the carboxyl functionality. This pressure may be higher than the vapor pressure of the water at any point within the injection (6) and reaction (7) zones, but it is not necessarily higher than that vapor pressure. As will be appreciated by one of ordinary skill in the art, the required residence time will vary depending on factors such as temperature, mixing efficiency and the reactivity of the particular components. Thus, by improving the mixing efficiency, for example, the reaction will be completed faster, thereby allowing for a decrease in residence time.

It is hypothesized that without ensuring that the pressure in the first melt seal zones is higher than the pressure of the water vapor at any point in the injection zone and reaction zone, it is possible for the water vapor to escape out the feed zone of the extruder. Similarly, if the pressure in the pressure build-up zone is too low, the water in the aqueous solution may vaporize before the metallic ions have had a chance to sufficiently react with the carboxyl functionality. If either of these scenarios happens, it is believed that the reduced amount of water would cause some of the metal salt to precipitate. Precipitated metal salts could lead to localized neutralization reaction causing gels. Furthermore, precipitated metal salts themselves could remain unreacted and be seen as white specs thereby decreasing the utility of the ionomers.

Ionomers prepared according to the current invention may be characterized by low amounts of gels (as determined using an at-line cast film analyzer) and/or low haze values (as determined according to ASTM D1003). The ionomers themselves are another aspect of the present invention.

Another aspect of the present invention is a method for producing a polymeric ionomer comprising the steps of: a) adding a polymer containing a carboxyl functionality to an extruder; b) homogenously melting the polymer in a melting zone of the extruder; c) forming a first melt seal zone of the extruder; d) adding an aqueous solution of metallic ions to the molten polymer in an injection zone of the extruder, wherein the injection zone is located after the first melt zone of the extruder; e) mixing the aqueous solution of metallic ions with the polymer containing the carboxyl functionality in a reaction zone of the extruder under conditions such that the metallic ions are substantially reacted with the carboxyl functionality; and d) forming a pressure build-up zone of the extruder, wherein the pressure build-up zone is located after the reaction zone. The first melt seal zone and the pressure build-up zone are formed by independently increasing the pressure in each zone to a pressure which for the first melt seal zone is higher than the vapor pressure of the water at any point in the injection zone and the reaction zone, and for the pressure build-up zone is high enough to ensure that the aqueous solution remains in liquid form for a period of time sufficient to allow the aqueous metallic ions to react with the carboxyl functionality. In some embodiments, the pressure build-up zone will also be at a pressure which is higher than the vapor pressure of the water at any point in the injection zone and the reaction zone. The pressure in the melt seal and pressure build-up zones are preferably developed using non-pumping elements or reverse pumping elements because those elements do perform as non-pumping barriers, which develop the much higher pressure than any elements with forward pumping capability.

Preferably, the method further comprises the steps of removing at least a portion of the water in one or more devolatilization zones of the extruder, wherein the devolatilization zone is located after the pressure build-up zone.

EXAMPLES

To demonstrate the utility of the present invention, a series of ionomers were made. In each example the base resin is an ethylene acrylic acid (EAA) copolymer having about 13.5 weight percent acrylic acid with a Melt Index (I) of 60 g/10 min as measured according to ASTM-D 1238 at a temperature of 190° C., using a weight of 2.16 kg. A 10 weight percent lithium hydroxide (LiOH) aqueous solution is injected at pressures of 100 psig (690 kpag) to 230 psig (1586 kPag) to make the ionomers. The schematic of the twin screw extruder used is similar to that depicted in FIG. 1, although different configurations were used in order to generate sufficient pressure. The calculated neutralization is the target percent neutralization as calculated by the relative flow rates of the individual components assuming 100% conversion.

Configuration #1 (Comparative)

Figure 2:
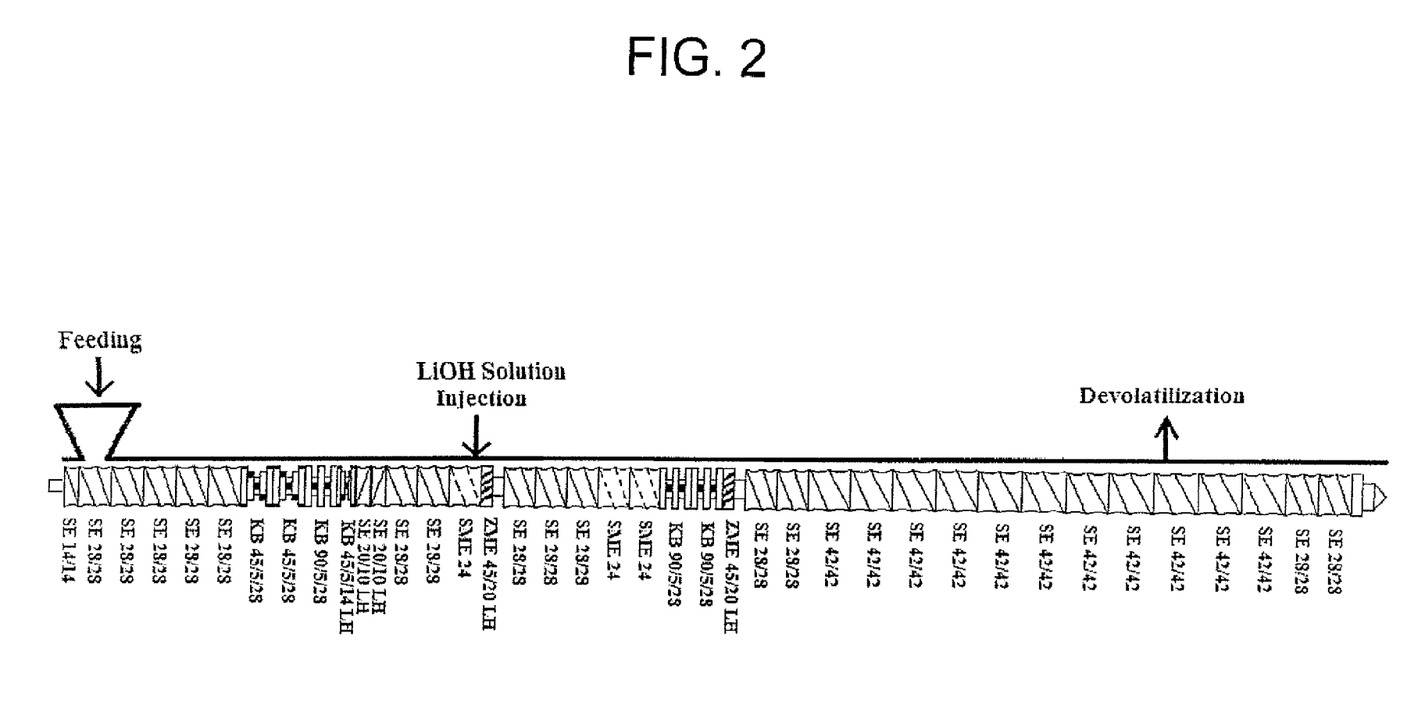
FIG. 2 is a schematic of the twin screw configuration #1 used in the Examples.

Screw Configuration #1 is depicted in FIG. 2. This screw configuration contains three mixing element zones. The first kneading disc block zone was designed to complete the melting of base resin and to develop the melt seal pressure. The second mixing element zone in the screw configuration was designed for LiOH solution injection. The third kneading disc block zone were designed to provide the intensive downstream mixing and to develop the melt seal pressure and residence time to prevent an escape of LiOH solution vapor before complete reaction.

In order to analyze the pressures developed in the melt seals along the Screw Configuration #1, a process simulation was performed. The calculated melt temperature at a peak of melt seal pressure, melt seal pressure at the peak, and water vapor pressure at a neutralization percent of 39 with Screw Configuration #1 were summarized in Table 1.

TABLE 1

The calculated melt temperature, melt seal pressures and water vapor pressure at three mixing elements zones at a neutralization percent of 39 and a feed rate of 15 lb/h (6.8 kg/h) with Screw Configuration #1.

|  | First Melt Seal (Melting Section) | Injection Point | Third Melt Seal |
| --- | --- | --- | --- |
| Calculated Melt Temperature at the Maximum Pressure, °C. | 159 | 200 | 215 |
| Calculated Maximum Pressure psig (kPag) | 161 (1110) | 0.9 (6.2) | 49.6 (324) |
| Water Vapor Pressure psig (kPag) | 159 (1096) | 200 (1379) | 215 (1482) |

As given in Table 1, the calculated maximum pressure in the first melt seal was 161 psig (1110 kpag) and water vapor pressure was 159 psig (1096 kPag). LiOH solution vapor may be backing up toward the first melt seal and may be precipitated as a white spec in the melting section, which is believed to result in the unreacted white specs. The melt pressures in the injection point and the third melt seal were much lower than water vapor pressure, which also is believed to contribute to the presence of white specs in the ionomer samples.

This configuration was used to produce Examples 1 through 5, which differ from each other by varying the LiOH solution injection rate as needed to produce the indicated neutralization level. The summary of operating conditions and the measured Melt Index are given in Table 2. As seen in the table, visually observable white specs are presented in all samples as predicted from the pressure calculations above.

TABLE 2

Summary of the operating conditions and process data with Screw Configuration #1.

| | Example # | | | | |
| --- | --- | --- | --- | --- | --- |
| | C-1 | C-2 | C-3 | C-4 | C-5 |
| Calculated Neutralization Level, % | 16.7 | 27.9 | 39.0 | 65.0 | 70.0 |
| Base Resin Rate, lb/h (kg/h) | 15 (6.8) | 15 (6.8) | 15 (6.8) | 15 (6.8) | 15 (6.8) |
| Screw Speed, rpm | 250 | 250 | 250 | 250 | 250 |
| Barrel Zone 1, °C. | not heated | not heated | not heated | not heated | not heated |
| Barrel Zone 2, °C. | 100 | 120 | 125 | 125 | 125 |
| Barrel Zone 3, °C. | 140 | 170 | 180 | 180 | 180 |
| Barrel Zone 4, °C. | 150 | 175 | 190 | 190 | 190 |
| Barrel Zone 5, °C. | 155 | 180 | 200 | 200 | 200 |
| Barrel Zone 6, °C. | 160 | 185 | 215 | 215 | 215 |
| Barrel Zone 7, °C. | 165 | 185 | 215 | 215 | 215 |
| Barrel Zone 8, °C. | 165 | 190 | 220 | 220 | 220 |
| Die, °C. | 170 | 190 | 220 | 220 | 220 |
| Discharge Temperature, °C. | 195 | 212 | 250 | 255 | 258 |
| Measured Melt Index, g/10 minute | 16.8 | 5.7 | 1.7 | 0.33 | 0.25 |
| Presence of White Specs (Visual Observation) | Yes | Yes | Yes | Yes | Yes |
| Presence of Gels (Visual Observation) | No | No | No | No | No |

Configuration #2 (Comparative)

Figure 3:
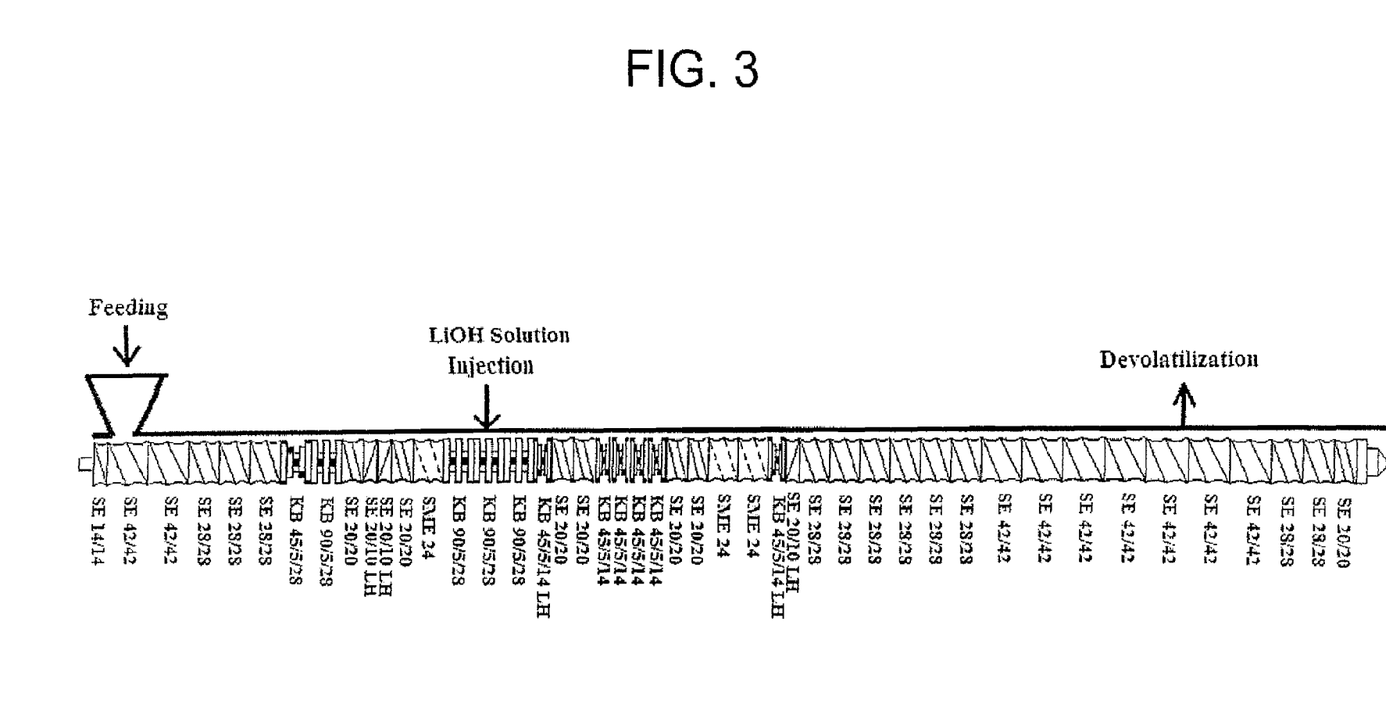
FIG. 3 is a schematic of the twin screw configuration #2 used in the Examples.

Screw Configuration #2 is shown in FIG. 3. The screw configuration contained four mixing element zones. The first kneading disc block zone with couple of left-handed screw elements was designed to complete the melting of the base resin at a lower temperature than Screw Configuration #1 and to develop a higher melt seal pressure than Screw Configuration #1. The second mixing element zone in the screw configuration was designed for LiOH solution injection. The third and fourth mixing element zones were designed to provide the extensive downstream mixing and to develop more melt seal pressure.

The calculated melt temperature at a peak of melt seal pressure, melt seal pressure at the peak, and water vapor pressure at a neutralization percent of 39 with Screw Configuration #2 were summarized in Table 3.

TABLE 3

The calculated melt temperature, melt seal pressures and water vapor pressure at three mixing elements zones at a neutralization percent of 39 and a feed rate of 20 lb/h (9.1 kg/h) with Screw Configuration #2.

|  | First Melt Seal (Melting Section) | Injection Point | Second Melt Seal | Third Melt Seal |
| --- | --- | --- | --- | --- |
| Calculated Melt Temperature at the Maximum Pressure, °C. | 140 (965) | 184 (1269) | — | 219 (1510) |
| Calculated Maximum Pressure, psig (kPag) | 604.8 (4170) | 14.5 (100) | Not fully filled | 29.0 (200) |

TABLE 3-continued

The calculated melt temperature, melt seal pressures and water vapor pressure at three mixing elements zones at a neutralization percent of 39 and a feed rate of 20 lb/h (9.1 kg/h) with Screw Configuration #2.

|  | First Melt Seal (Melting Section) | Injection Point | Second Melt Seal | Third Melt Seal |
|---|---|---|---|---|
| Water Vapor Pressure, psig (kPag)) | 52.2 (360) | 182.0 (1255) | — | 288.0 (1986) |

With Screw Configuration #2, the ionomers with a targeted Melt Index of 2 g/10 minute were produced at two different rates. The summary of operating conditions, process data, and measured Melt Index for 2 g/10 minute and 1 g/10 minute ionomers are given in Table 4.

TABLE 4

Summary of the operating conditions, process data and measured Melt Index with Screw Configuration #2.

|  | Sample # | | |
|---|---|---|---|
|  | C-6 | C-7 | C-8 |
| Target Melt Index, g/10 minute | 2 | 2 | 1 |
| Calculated Neutralization Level, % | 36.2 | 36.2 | 45.5 |
| Base Resin Rate, lb/h (kg/h) | 20 (9.1) | 30 (13.6) | 30 (13.6) |
| Barrel Zone 1, ° C. | N/A | N/A | N/A |
| Barrel Zone 2, ° C. | 120 | 120 | 120 |
| Barrel Zone 3, ° C. | 150 | 150 | 150 |
| Barrel Zone 4, ° C. | 170 | 170 | 170 |
| Barrel Zone 5, ° C. | 205 | 205 | 220 |
| Barrel Zone 6, ° C. | 220 | 220 | 250 |
| Barrel Zone 7, ° C. | 220 | 220 | 250 |
| Barrel Zone 8, ° C. | 220 | 220 | 250 |
| Die, ° C. | 230 | 230 | 250 |
| Discharge Temperature, ° C. | 251 | 250 | 269 |
| Mean Residence Time, sec | 50 | 42 | 41 |
| Measured Melt Index, g/10 minute | 5.9 | 5.5 | 2.5 |
| Presence of White Specs (Visual Observation) | Yes | Yes | Yes |
| Presence of Gels (Visual Observation) | No | Yes | Yes |

The calculated maximum pressure in the first melt seal was 604.8 psig (4170 kpag) and water vapor pressure was 52.2 psig (360 kpag). It is believed that the maximum pressure in the first melt seal is high enough to prevent backing up of LiOH solution vapor toward the first melt seal. However, the maximum pressures in the third and the fourth were much lower than water vapor pressure, which contributes the presence of white specs in the ionomer samples. Accordingly this screw configuration did not provide enough downstream mixing after injection, which results in visually observable gels.

Configuration #3

Figure 4:
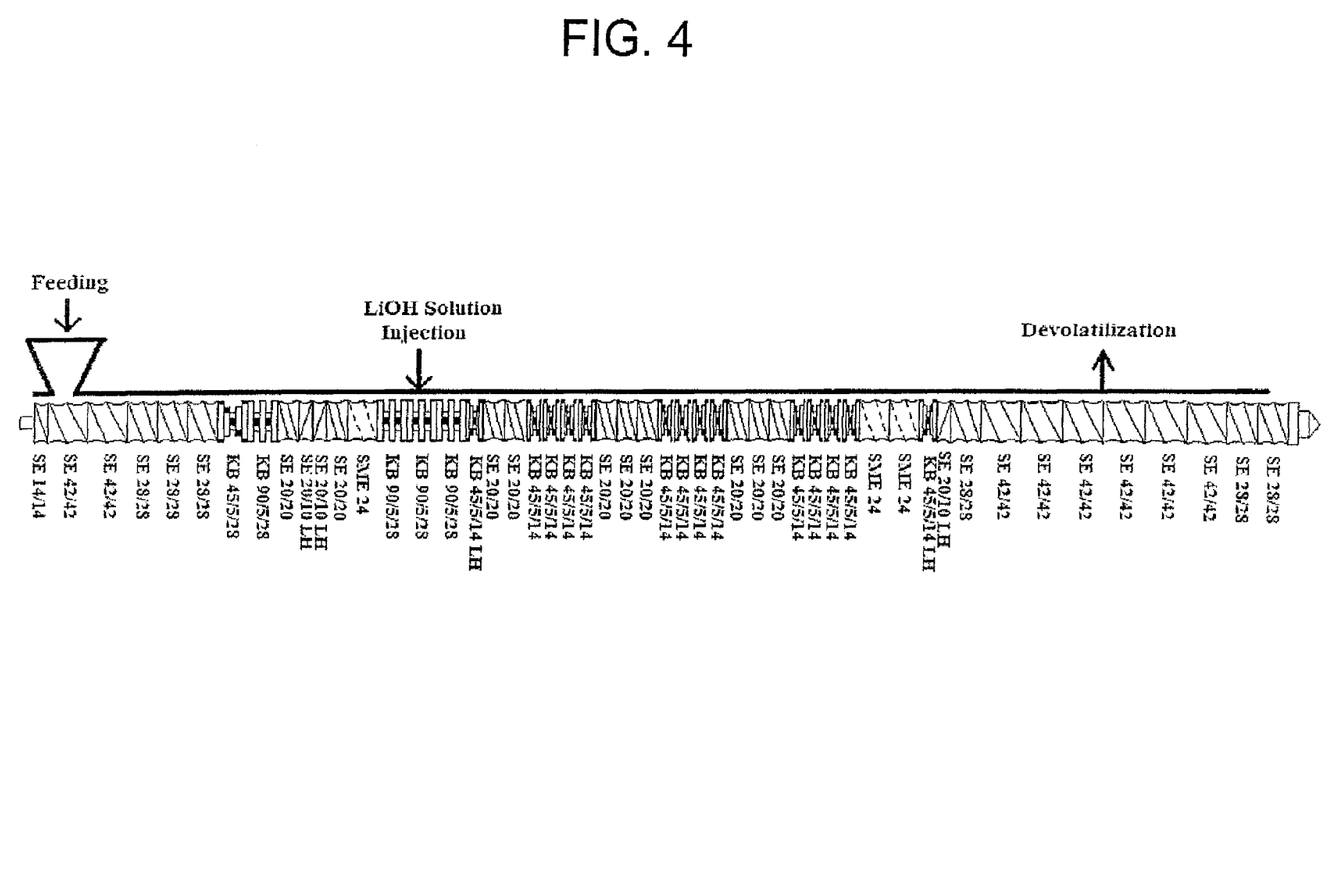
FIG. 4 is a schematic of the twin screw configuration #3 used in the Examples.

FIG. 4 shows Screw Configuration #3. The first kneading disc block zone with couple of left-handed screw elements was designed to complete the melting of the base resin at a lower temperature than Screw Configuration #1 and to develop a higher melt seal pressure than Screw Configuration #1. The second mixing element zone in the screw configuration was designed for LiOH solution injection. The melting section (first mixing element zone) and the injection point (second mixing element zone) are the same as Screw Configuration #2. The third, fourth, and fifth mixing element zones were designed to provide the extensive downstream mixing and to develop the enough melt seal pressure to prevent an escape of LiOH solution vapor before complete reaction. Screw Configuration #4 has most extensive mixing zones after LiOH solution injection point.

The calculated melt temperature at a peak of melt seal pressure, melt seal pressure at the peak, and water vapor pressure at a neutralization percent of 39 with Screw Configuration #3 were summarized in Table 5.

TABLE 5

The calculated melt temperature, melt seal pressures and water vapor pressure at three mixing elements zones at a neutralization percent of 39 and a feed rate of 20 lb/h (9.1 kg/h) with Screw Configuration #3.

|  | First Melt Seal (Melting Section) | Injection Point | Second Melt Seal | Third Melt Seal | Fourth Melt Seal |
|---|---|---|---|---|---|
| Calculated Melt Temperature at the Maximum Pressure, ° C. | 140 | 177 | — | — | 256 |
| Calculated Maximum Pressure, psig (kpag) | 604.8 (4170) | 17.4 (120) | Not fully filled | Not fully filled | 639.0 (4406) |
| Water Vapor Pressure, psig (kPag) | 52.2 (360) | 135.6 (935) | — | — | 158.1 (1090) |

The summary of operating conditions, process data and measured Melt Index for 2 g/10 minute and 1 g/10 minute ionomers at different rates are given in Table 6.

TABLE 6

Summary of the operating conditions, process data and measured Melt Index with Screw Configuration #3.

|  | Sample # | | | | | |
| --- | --- | --- | --- | --- | --- | --- |
|  | 9 | 10 | 11 | 12 | 13 | 14 |
| Target Melt Index, g/10 minute | 2 | 2 | 2 | 2 | 2 | 1 |
| Calculated Neutralization Level, % | 36.2 | 36.2 | 36.2 | 36.2 | 36.2 | 45 |
| Base Resin Rate lb/h (kg/h) | 20 (9.1) | 25 (11.3) | 30 (13.6) | 35 (15.9) | 40 (18.1) | 30 (13.6) |
| Barrel Zone 1, °C. | no heating | no heating | no heating | no heating | no heating | no heating |
| Barrel Zone 2, °C. | 120 | 120 | 120 | 120 | 120 | 120 |
| Barrel Zone 3, °C. | 150 | 150 | 150 | 150 | 150 | 150 |
| Barrel Zone 4, °C. | 170 | 170 | 170 | 170 | 170 | 170 |
| Barrel Zone 5, °C. | 205 | 205 | 205 | 205 | 205 | 205 |
| Barrel Zone 6, °C. | 220 | 220 | 220 | 220 | 220 | 220 |
| Barrel Zone 7, °C. | 220 | 220 | 220 | 220 | 220 | 220 |
| Barrel Zone 8, °C. | 220 | 220 | 220 | 220 | 220 | 220 |
| Die, °C. | 230 | 230 | 230 | 230 | 230 | 230 |
| Discharge Temperature, °C. | 250 | 254 | 253 | 254 | 247 | 253 |
| Mean Residence Time, sec | 60 | 53 | 53 | 42 | 40 | 44 |
| Measured Melt Index, g/10 minute | 5.4 | 5.2 | 6.0 | 5.0 | 4.8 | 2.5 |
| Presence of White Specs (Visual Observation) | No | No | No | No | No | No |
| Presence of Gels (Visual Observation) | No | No | No | No | No | No |

Even though the maximum pressures in the second, third and the fourth zones were lower than water vapor pressure, no visible white specs and/or gels were present in the ionomer samples because this reaction section had a sufficient residence time to complete the reaction.

To those skilled in the art, it is recognized that as the neutralization reaction proceeds, the viscosity increases. Therefore, to ensure that the reaction was completed in a single pass, all ionomer samples were re-extruded using ZSK 30 intermeshing co-rotating twin-screw extruder, and the melt index was measured again to determine if additional neutralization occurred. In all cases there-extruded ionomer samples did not show any change of melt index, indicating no further reaction.

Sodium Ionomers In the following examples the base resin is an ethylene acrylic acid (EAA) copolymer having about 13.5 weight percent acrylic acid with a Melt Index ($I_2$) of 60 g/10 min as measured according to ASTM-D1238 at a temperature of 190° C., using a weight of 2.16 kg. Various concentrations of sodium hydroxide (NaOH) aqueous solutions are injected into a 40 mm diameter co-rotating twin-screw extruder similar to that depicted in FIG. 4 to make the ionomers. The calculated neutralization is the target percent neutralization as calculated by the relative flow rates of the individual components assuming 100% conversion. The reactive process data are given in Table 6. The Melt Flow was measured in accordance to ASTM-D1238 at a temperature of 190° C., using a weight of 2.16 kg, and measuring the weight in grams after 10 minutes. The Yellowness index was determined according to ASTM 6290. The resulting MI and Yellowness Index (YI) for the sodium ionomer samples are also given in Table 7.

TABLE 7

Na ionomer data data

| | Sample Identification | | |
|---|---|---|---|
| | Na ionomer_1 | Na ionomer_2 | Na ionomer_3 |
| Screw Speed (rpm) | 250 | 250 | 250 |
| Feed Rate of EAA (lb/h) | 20 | 20 | 20 |
| Target Melt Index (MI) (dg/10 min) | 0.5 | 1.8 | 1.8 |
| Target Neutralization (%) | 58 | 47 | 47 |
| Concentration of NaOH solution (% wt/vol) | 50 | 50 | 10 |
| Injection Rate of NaOH solution (ml/min) | 8.5 | 6.8 | 47.9 |
| Barrel Temperature Profiles | | | |
| Zone 1 (° C.) | 0 | 0 | 0 |
| Zone 2 (° C.) | 120 | 120 | 120 |
| Zone 3 (° C.) | 150 | 150 | 150 |
| Zone 4 (° C.) | 170 | 170 | 170 |
| Zone 5 (° C.) | 205 | 205 | 205 |
| Zone 6 (° C.) | 220 | 220 | 220 |
| Zone 7 (° C.) | 220 | 220 | 220 |
| Zone 8 (° C.) | 220 | 220 | 215 |
| Die (° C.) | 220 | 220 | 215 |
| Torque Rate (%) | 69 | 70 | 64 |
| Discharge Pressure (psi) | 190 | 210 | 170 |
| Discharge Temperature (° C.) | 250 | 246 | 247 |
| Melt Index (190° C., 2.16 kg) | 0.5 | 1.9 | 1.9 |
| Yellowness Index | 48.6 | | 10.1 |

We claim:

1. A reactive extrusion process for producing an ionomer comprising the steps of:
    a. adding a polymer containing a carboxyl functionality to an extruder;
    b. homogenously melting the polymer in a melting zone of the extruder;
    c. forming a first melt seal zone of the extruder;
    d. adding an aqueous solution of metallic ions to the molten polymer in an injection zone of the extruder, wherein the injection zone is located after the first melt seal zone of the extruder;
    e. mixing the aqueous solution of metallic ions with the polymer containing the carboxyl functionality in a reaction zone of the extruder under conditions such that the metallic ions are substantially reacted with the carboxyl functionality;
    f. forming a pressure build-up zone in the extruder, wherein the pressure build-up zone is located no earlier than at the end of the reaction zone;
wherein the first melt seal zone is formed by increasing the pressure in the melt seal zone to a pressure which is higher than the vapor pressure of the water at any point in the injection zone and the reaction zone; and wherein the pressure build-up zone is formed by increasing the pressure to a level such that the aqueous solution of metallic ions remains in the liquid phase for a time sufficient to allow for the desired reaction between the metallic ions and the carboxyl functionality of the polymer.

2. The process of claim 1 further comprising:
    g. removing at least a portion of the water in one or more devolatilization zones of the extruder, wherein the devolatilization zone is located after the pressure build-up zone.

3. The process of claim cm 1 wherein the pressure in the first seal zone is developed using non-pumping elements or reverse pumping elements.

4. The process of claim 1 wherein the aqueous metallic solution is heated thereby increasing the solubility of the ionic species.

5. The process of claim 1 wherein a volatile co-solvent is added.

6. The process of claim 1 wherein the resin is an ethylene—ester copolymer and wherein a portion of the ester functionality is convened into a carboxylic acid functionality prior to entering the first melt seal.

7. The process of claim 1 wherein there are one or more additional reaction zones in the extruder profile.

8. The process of Claim 1 wherein the pressure build-up zone is at a pressure which is higher than the vapor pressure of the water at any point in the injection zone and the reaction zone.

9. The process of claim 1 wherein the metallic ions are selected from the group consisting of the mono-, di-, and trivalent ions of metals in Groups I, II, and III of the periodic table of Elements and combinations thereof.

10. The process of claim 9 wherein the metallic ion is an alkali metal.

11. The process of claim 10 wherein the metallic ion is lithium.

12. The process of claim 1 wherein the aqueous solution is in the form of a slurry.

* * * * *